United States Patent [19]
Cunningham

[11] 3,799,609
[45] Mar. 26, 1974

[54] SEATS FOR MOTOR VEHICLES
[75] Inventor: Douglas James Cunningham, W. Chichester, England
[73] Assignee: Wingard Limited, Chichester, Sussex, England
[22] Filed: Mar. 28, 1972
[21] Appl. No.: 238,790

[30] Foreign Application Priority Data
  Apr. 16, 1971  Great Britain................... 9612/71

[52] U.S. Cl......................... 297/307, 340, 384–386;
[51] Int. Cl.......................... B60n 1/06, A47c 1/032
[58] Field of Search.......... 297/307, 340, 384, 386; 248/393, 399

[56] References Cited
UNITED STATES PATENTS
3,493,211  2/1970  Barecki et al..................... 248/399
3,429,613  2/1969  Rice................................... 248/399

Primary Examiner—Casmir A. Nunberg
Attorney, Agent, or Firm—Scrivener, Parker, Scrivener & Clarke

[57] ABSTRACT

A safety seat for vehicles capable of taking the inertia forces on the seat and its occupant in the event of an accident has the seat cushion and back squab supported between rigid side members pivotally connected at their rear ends to fixed anchorages on the floor of the vehicle and in slidable and lockable engagement at their front ends with upstanding leg members pivoted at their lower ends on other fixed floor anchorages.

5 Claims, 3 Drawing Figures

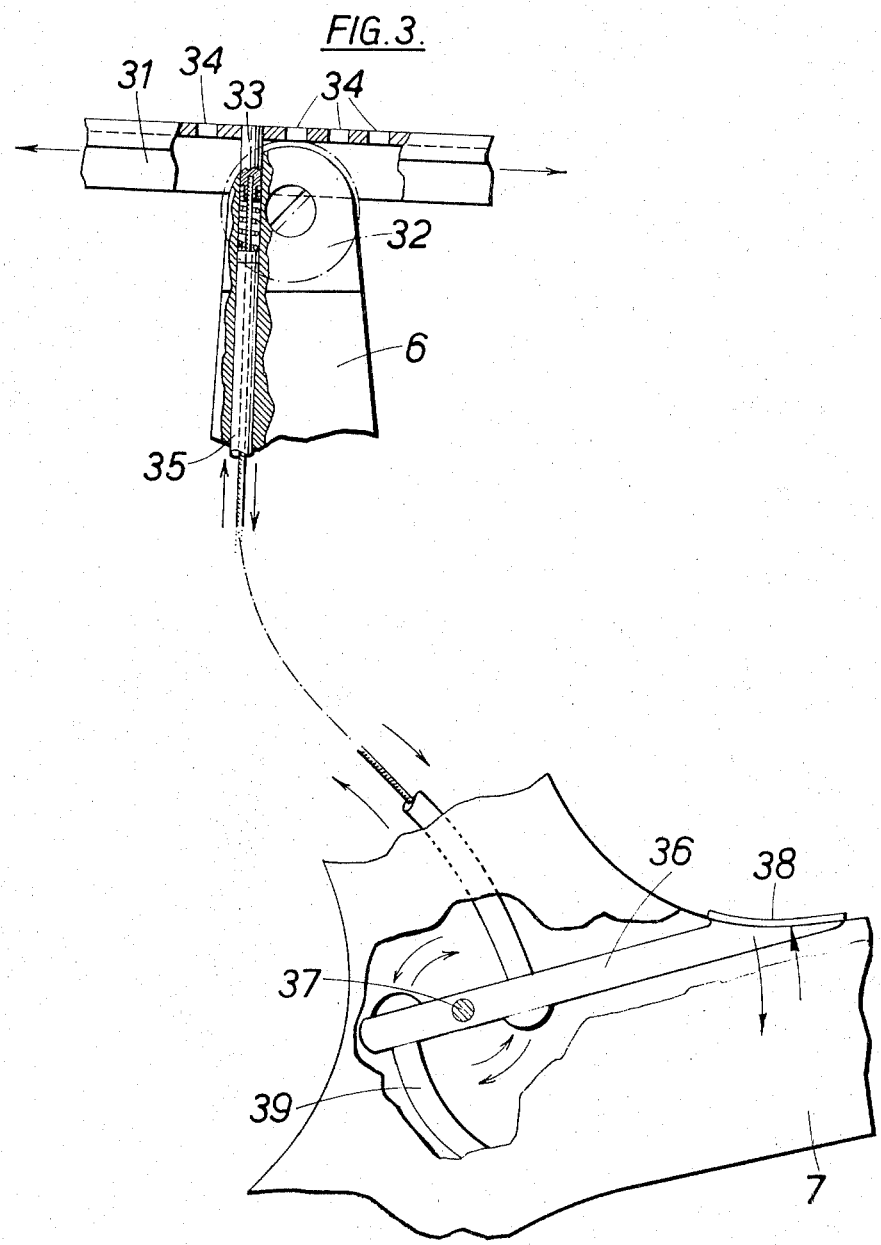

SEATS FOR MOTOR VEHICLES

This invention relates to improvements in seats for motor vehicles.

The usual front seats of a motor-car for the driver and front passenger are mounted on slides secured to the floor to provide fore-and-aft adjustment, releasable detents being provided for locating the seat in any position in which it is set. These detents have to take any inertia forces on the seat in the event of an accident or rapid deceleration of the vehicle, and they also have to take the inertia forces on the occupant of the seat unless he is located by a safety seat belt anchored to the floor or other part of the vehicle independently of the seat.

One of the objects of our invention is to provide a vehicle seat which is mounted on the floor of the vehicle in such a manner as to be capable of taking the full inertia forces to which the seat and its occupant are liable to be subjected and in which fore-and-aft adjustment of the seat is retained.

In a seat for a vehicle according to our invention the seat cushion and back squab are supported between parallel rigid side frame members which are pivotally connected at their rear ends to stationary anchorages on the floor of the vehicle and at their forward ends are slidably and lockably engaged with upstanding front legs which are pivotally connected at their lower ends to stationary floor anchorages, the front part of the seat cushion being pivotally connected to the upper ends of the front legs and the upper end of the rear squab being pivotally connected to upwardly extending portions of the side frames at their rear ends, whereby inertia forces on the seat and an occupant are taken by the floor anchorages for the rear ends of the side frames and for the front legs.

In a preferred construction each side frame member comprises three angularly spaced arms of which one is rearwardly and downwardly inclined from the junction of the arms and is pivotally connected at its free end to a bracket or other stationary anchorage on the vehicle floor, the second, which extends upwardly and is rearwardly inclined at a small angle to the vertical, is pivotally connected at its upper end to the upper part of the back squab, and the third, which extends forwardly and is substantially horizontal, has a releasable and adjustable connection with an arcuate front leg member which supports the front part of the seat cushion and is pivotally connected at its lower end to a bracket or other fixed anchorage on the floor.

An anchorage for a seat belt, which may be one part of a two-part separable buckle, is mounted on the upper side of the frame member adjacent to the junction of the second and third members, and any pull on the belt caused by inertia forces acting on the occupant of the seat is taken directly through the frame member by the floor anchorage of the first arm and does not impose any load on the seat cushion or back squab.

One practical form of safety seat in accordance with our invention is illustrated by way of example in the accompanying drawings in which:

FIG. 3 is a diagrammatic view showing the means for adjusting the inclination of the back.

Figure 1:
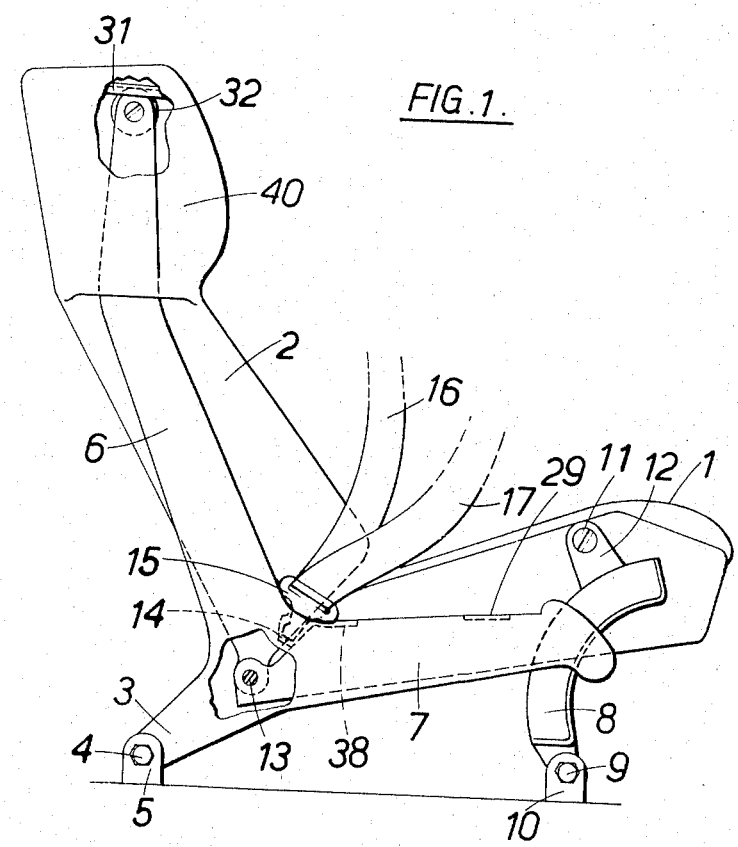
FIG. 1 is a side elevation of the seat.

In the seat illustrated the seat cushion 1 and the back squab 2 are located between and carried by two rigid side frames each comprising three angularly spaced arms. One arm 3 is inclined rearwardly and downwardly from the junction of the arms and is pivotally connected by a bolt 4 to an anchorage 5 fixed to the floor of the vehicle. A second arm 6 extends upwardly and is rearwardly inclined at a small angle to the vertical, and the upper end of the back squab 2 is pivotally connected to the upper end of this arm for adjustment in a fore-and-aft direction as described below. The third arm 7 extends forwardly from the junction and is substantially horizontal. The forward end of this arm has an adjustable locking engagement with an arcuate front leg 8 of which the lower end is pivotally connected by a bolt 9 to a floor anchorage 10.

Adjacent to its front edge the seat is pivotally connected by a bolt 11 to a lug 12 extending upwardly from the upper end of the leg 8. The rear end of the seat cushion and the lower end of the back squab are pivotally connected by a pin 13.

It will be understood that the seat cushion and back squab incorporate light frames which carry the upholstery and to which the various pivotal connections with the rigid side members and front legs are made.

An anchorage 14 for a seat belt is mounted on the side member at a point substantially in alignment with the anchorage 5 which in this case is adjacent to the junction of the arms 6 and 7. This is conveniently one part of a two-part separable buckle of which the other part 15 is a tongue to which lap and diagonal straps 16, 17 are connected and which can be pushed with one hand into the part 14. Any pull on the belt caused by inertia forces acting on the occupant of the seat in the event of an accident or a sudden stop is taken directly through the side frame by the floor anchorage 5 and does not impose any load on the seat.

To adjust the seat in a fore-and-aft direction the locking engagement between the arm 7 and the front leg 8 is disengaged and the leg is rocked over forwardly or rearwardly, taking the seat cushion with it. The seat cushion takes the lower end of the back squab with it, the back squab moving through a small angle about its pivotal connection to the upper end of the arm 6.

The side member also moves angularly through a relatively small angle about the floor anchorage 5.

After adjustment the seat is locked in the position into which it has been moved by re-engaging the arm 7 with the leg 8.

In any position of the seat the angle of the back squab can be adjusted by adjusting its upper end in a fore-and-aft direction relative to the upper end of the arm 6 of the side frame.

Any convenient means may be employed for making the adjustable locking connection between the side frames and thr front legs and between the upper end of the back squab and the arm 6 of the side frames, these means being duplicated on opposite sides of the seat and being actuated simultaneously by manual controls.

Figure 2:
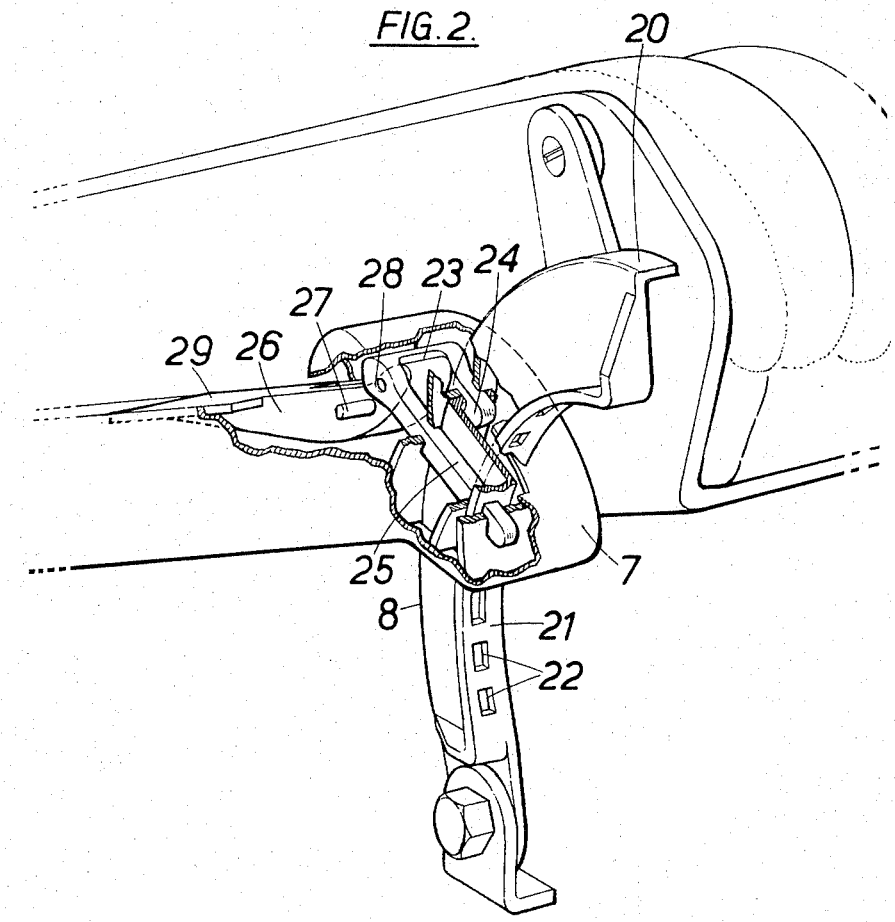
FIG. 2 is a perspective view partly in section of the adjustable connection between a side frame member and a front leg.

FIG. 2 shows a preferred form of adjustable locking connection between the arm 7 of a side member and a front leg 8.

The leg is an arcuate member of Z cross-section having spaced concentric flanges 20, 21 in which are formed spaced apertures 22. The front end of the arm 7 of the side member is shaped to receive and slide on the leg. A locking bar 23 located in the leg has two parallel fingers 24, 25 of different lengths. The shorter finger 24 is adapted to engage in one of the apertures 22 in the rear flange 20 of the leg while the other finger 25 is adapted to engage simultaneously in an aperture in the front flange 21. The fingers are urged into the locking position by any convenient from of spring-loading (not shown) and are retracted by a lever 26 pivoted at 27 in the arm and coupled by a pin 28 to the locking bar.

The free end of the lever terminates in a push-plate 29 which is depressed to free the locking means for adjustment of the seat.

The lever is coupled by a bowden cable or other transmission member to the corresponding lever of identical locking mechanism on the other side of the seat so that both are actuated simultaneously.

The mechanism for adjustment of the inclination of the back squab is shown diagrammatically in FIG. 3. An angle or channel-section member 31 is incorporated in the upper end of the back squab and is in rolling engagement with a roller 32 mounted in the upper end of the arm 6 of the side member. A substantially vertical spring-pressed plunger 33 mounted in the arm is adapted to be engaged in any one of a series of spaced holes 34 in the member 31. The plunger is retracted by a bowden cable transmission 35 from a lever 36 pivoted at 37 on the side member. A push-plate 38 is provided on the free end of the lever for actuating it to withdraw the plunger, and the lever is coupled by another bowden cable 39 to a similar plunger on the other side of the seat.

When the plungers are withdrawn the back squab can be moved angularly about its pivotal connection 13 to the rear end of the seat cushion.

In a modification the seat cushion and back squab may be rigidly connected in which case the inclination of the back squab will vary with the position of the seat cushion, the combined seat cushion and back squab being in effect suspended between the connection of the upper part of the back squab to the arm 6 of the side frame and the connection of the front of the seat cushion to the front leg.

With this arrangement the seat cushion and back squab can be made of relatively light construction and could, for example, be formed by a moulding in a suitable plastics material to which the upholstery is fitted.

Both the seat cushion and the back squab are preferably of such configuration as to fit snugly around the occupant of the seat and hold him against appreciable lateral movement.

The upper end of the back squab may carry a head rest or it may be carried up high enough to support the head of an occupant of the seat without requiring a separate head rest. Preferably the upper part of the squab is formed with forwardly extending side wings 40 to prevent the occupant's head from excessive lateral movement in the event of high lateral accelerations which might be produced, for example, by an impact on the side of the vehicle.

It will be appreciated that the seat has been designed to take the full inertia forces to which it is liable to be subjected by the weight of the seat itself and of the occupant in the event of a collision or other accident. These forces are taken by the rear anchorages 5 for the side frames and by the anchorages 10 for the front legs to which the front ends of the side frames are rigidly locked so that there is no risk of the seat breaking loose.

I claim:

1. A vehicle seat comprising a seat cushion and a back squab and mounted on the floor of the vehicle for adjustment in a fore-and-aft direction wherein the seat cushion and back squab are supported between two side frame members each comprising three angularly spaced arms which are rigid with each other and of which the first is rearwardly and downwardly inclined from the junction of the arms and is pivotally connected at its free end to a stationary anchorage on the floor of the vehicle, the second, which extends upwardly and is rearwardly inclined at a small angle to the vertical, is pivotally connected at its upper end to the upper part of the back squab, and the third, which extends forwardly and is substantially horizontal, has a sliding lockable engagement with an arcuate front leg which supports the front part of the seat cushion and is pivotally connected at its lower end to a fixed anchorage on the floor, whereby inertia forces on the seat and an occupant are taken by the floor anchorages for said first arm and said front leg.

2. A vehicle seat as in claim 1 wherein an anchorage for a safety seat belt is mounted on a side frame member in such a position that, irrespective of the position of the seat relative to the side frame members, any pull on the belt is taken from the floor directly through the first arm of said side frame member.

3. A vehicle seat comprising a seat cushion and a back squab and mounted on the floor of the vehicle for adjustment in a fore-and-aft direction wherein the seat cushion and back squab are supported between two side frame members each comprising three angularly spaced arms of which the first is rearwardly and downwardly inclined from the junction of the arms and is pivotally connected at its free end to a stationary anchorage on the floor of the vehicle, the second, which extends upwardly and is rearwardly inclined at a small angle to the vertical, is pivotally connected at its upper end to the upper part of the back squab, and the third, which extends forwardly and is substantially horizontal, has a sliding lockable engagement with an arcuate front leg which supports the front part of the seat cushion and is pivotally connected at its lower end to a fixed anchorage on the floor.

4. A vehicle seat as in claim 3 wherein the free end of the third arm is formed to receive and be slidable over the front leg and incorporates manually operated means for locking the arm to the leg in a number of different relative positions.

5. A vehicle seat as in claim 3 wherein the upper end of the back squab is adjustable in a fore-and-aft direction relative to the upper end of the second arm of the side frame and manually operated means are incorporated for locking the squab to the arm in a number of different relative position.

* * * * *